United States Patent
Schwarz et al.

(10) Patent No.: US 6,401,005 B1
(45) Date of Patent: Jun. 4, 2002

(54) PROGRAMMABLE SYNCHRONOUS AND ASYNCHRONOUS BLOCK EXECUTION FOR A COMPUTER NUMERICAL CONTROL

(75) Inventors: William C. Schwarz, Shaker Heights; Fabio Malaspina, Twinsburg, both of OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/406,659

(22) Filed: Sep. 27, 1999

(51) Int. Cl.[7] ............................................. G06F 19/00
(52) U.S. Cl. ..................... 700/159; 700/181; 709/400
(58) Field of Search .......................... 700/95, 182, 200, 700/203, 165, 145, 2, 6, 7, 169, 159; 707/502; 709/400; 713/201

(56) References Cited

U.S. PATENT DOCUMENTS

| | | | |
|---|---|---|---|
| 4,314,329 A | * 2/1982 | Crewe et al. | 700/12 |
| 4,418,381 A | 11/1983 | Molusis et al. | 700/2 |
| 4,446,525 A | * 5/1984 | Hoch et al. | 700/181 |
| 5,617,528 A | 4/1997 | Stechmann et al. | 707/517 |
| 5,652,866 A | 7/1997 | Aldred et al. | 703/23 |
| 5,691,897 A | 11/1997 | Brown et al. | 700/56 |
| 5,737,523 A | 4/1998 | Callaghan et al. | 713/201 |
| 5,764,155 A | 6/1998 | Kertesz et al. | 700/295 |
| 5,822,207 A | 10/1998 | Hazama et al. | 700/97 |
| 5,828,575 A | 10/1998 | Sakai | 700/182 |
| 5,852,441 A | 12/1998 | Nakajima et al. | 345/366 |
| 5,914,876 A | * 6/1999 | Hirai | 700/181 |
| 5,988,846 A | * 11/1999 | Flamm et al. | 700/122 |

OTHER PUBLICATIONS

Walter Stanislowski, "Instrument Control Enhancements Using Microsoft Windows 3.0", IEEE 1992, pp. 239–242.
Dorin Carstoiu et al., "Netware Dynamic Data Exchange", IEEE 1994, pp. 284–287.
Barcellos et al., "A Novel Waveform Analyzer For Analog and Digital Signals For The Windows® Environment", pp. 385–388 Brazil.

* cited by examiner

Primary Examiner—Leo P. Picard
Assistant Examiner—Kidest Bahta
(74) Attorney, Agent, or Firm—Robert A. Van Someren; Alexander M. Gerasimow; R. Scott Speroff

(57) ABSTRACT

A computer numerical control system for providing more efficient execution of part program blocks. The computer numerical control system selectively may be utilized in a synchronous mode in which the part program blocks are executed under control of a logic engine. This synchronous operation may be changed to an asynchronous operation, and vice versa, by providing a synchronization control parameter in the part program. Additionally, the system may be switched to an auto-synchronous mode in which part program block execution automatically is accomplished in either synchronous mode or asynchronous mode depending on the content of the data blocks being processed.

21 Claims, 6 Drawing Sheets

INTERPOLATION TABLE

| | FG LOGIC SCAN TIME | FINE FG SCAN TIME |
|---|---|---|
| ASYNCH MODE (ALL BLOCKS) | | PRIMARY INTERP & SECONDARY INTERP |
| SYNCH MODE (ALL BLOCKS) | PRIMARY INTERP | SECONDARY INTERP |
| AUTO-SYNCH MODE (MOTION ONLY BLOCK) | | PRIMARY INTERP & SECONDARY INTERP |
| AUTO-SYNCH MODE (NON-MOTION BLOCK) | PRIMARY INTERP | SECONDARY INTERP |
| AUTO-SYNCH MODE (HYBRID BLOCK) | PRIMARY INTERP | SECONDARY INTERP |

FIG. 5

PROGRAMMABLE SYNCHRONOUS AND ASYNCHRONOUS BLOCK EXECUTION FOR A COMPUTER NUMERICAL CONTROL

FIELD OF THE INVENTION

The present invention relates generally to a computer numerical control, and particularly to a computer numerical control in which the part program block execution may be run in synchronization with a controlling logic engine or run asynchronously based on a program input.

BACKGROUND OF THE INVENTION

A variety of controls are used to monitor and control various types of machine motion. For example, processor-based controls, such as computer numerical controls or CNCs, are used to control the motion of machines, such as machine tools, that are used in a variety of manufacturing environments. A CNC, for instance, may be used to control the movements of a cutter on a machine tool when machining a part or component for use in the manufacture of a given product.

CNC-type controllers have become very popular due, in part, to their adaptability and relative ease-of-use in controlling machine motion. When machining a part, for example, a machine motion control program, e.g., part program, simply can be loaded into the CNC which then causes the machine to move according to the commands established by the part program. The control is designed to read the part program instructions and provide appropriate outputs to the various servos, stepper motors, etc. that physically move the components of the machine.

The CNC also may be used to monitor multiple items related to motion control. For example, in a closed loop system, a variety of sensors are disposed on the machine to provide outputs to the CNC indicative of various parameters, such as position and speed. The CNC compares the sensed parameters with the programmed parameters to detect and correct for any error between the values. As is understood by those of ordinary skill in the art, CNC-type controllers are able to process a wide variety of data related to controlling machine motion, monitoring machine motion, interaction with other machines, such as tool changers, storing and manipulating part program data, etc.

Traditionally, CNCs have been configured in various ways depending on the CNC design established by the CNC manufacturer and/or end user. For example, CNCs typically have included a visual interface, such as a CRT, and a keyboard that allow machine control programs to be entered or edited directly at the CNC. In some systems, machine control programs can be prepared off site at a workstation, such as a personal computer, that is configured to permit an operator to prepare motion control programs. Personal computers and CNC functions have been mixed or used in cooperation as well. For example, personal computers have been used to execute certain CNC tasks, or CNCs and personal computers have been used in cooperation to execute and/or monitor various aspects of a motion control program.

Regardless of the specific design, a typical controller utilizes a CNC executive for controlling execution of the motion control part program blocks. However, each of the part program blocks is subjected to the control of a logic engine that ultimately decides whether it is appropriate for a given part program block to be executed. Thus, the minimum block cycle time of a CNC system may be limited by the scan frequency of its logic engine. This limitation can restrict the part contours or the feed rates of the control. For example, when machining complex contours, the part program blocks can be extremely short and executable in a time interval less than the logic engine scan time interval. When under control of the logic engine, however, the execution of the subsequent part program block must wait for the completed scan of the logic engine. In other words, the synchronization of block execution with the scan frequency of the logic engine requires that the feed rate be lowered for complex contours.

If, on the other hand, the block execution is not synchronized with the scan rate of the logic engine, the logic engine does not control execution of the part program blocks. This can be problematic during the execution of various program blocks, such as non-motion blocks where logic engine control is necessary to avoid, for example, collision of the CNC spindle with a cooperating component, such as a tool changer.

It would be advantageous to selectively limit the minimum block cycle time for only those part program blocks that actually need to be controlled by the logic engine, while letting the remainder of the blocks execute at a faster rate.

SUMMARY OF THE INVENTION

The present invention relates to a computer numerical control system. The system includes a block execution module able to execute a plurality of data blocks in a part program of the type used for controlling a machine. The system also includes a logic engine module able to control the execution of one or more of the plurality of data blocks depending on the parameters of the part program. The logic engine module operates according to a logic engine scan rate and the block execution module operates at a block execution scan rate that is in a synchronous mode or an asynchronous mode with respect to the logic engine scan rate. The system also includes a synchronization control parameter that may be entered in the part program to be executed. The synchronization control parameter is able to initiate a change between the synchronous mode and the asynchronous mode during execution of the part program.

According to another aspect of the invention, a method is provided for executing a part program on a computer numerical control. The method includes executing a plurality of data blocks of a control program at a given block cycle time. The method further includes subjecting at least some of the plurality of data blocks to the control of a logic engine operating at a logic scan rate. The method also includes selectively changing the execution of the plurality of data blocks from a synchronized state with the logic engine to an asynchronized state during execution of the control program.

According to another aspect of the present invention, a method is provided for efficient operation of a computer numerical control. The computer numerical control is of the type that utilizes a logic engine having a logic scan frequency. The method comprises executing certain blocks of a motion control program in synchronization with the logic engine. The method also includes executing other blocks of the motion control program in asynchronization with the logic engine. Additionally, the method includes changing between synchronized execution and asynchronized execution during execution of the motion control program.

BRIEF DESCRIPTION OF THE DRAWINGS

The invention will hereafter be described with reference to the accompanying drawings, wherein like reference numerals denote like elements, and:

FIG. 5 provides a table illustrating the various modes of operation of the CNC illustrated in FIG. 1;

DETAILED DESCRIPTION OF THE PREFERRED EMBODIMENTS

The computer numerical control system described herein allows for greater efficiency in the execution of motion control programs, sometimes referred to as part programs. The greater efficiency is accomplished by allowing execution of part program blocks asynchronously with respect to the scan frequency of the CNC system logic engine. The present system utilizes a new block execution mode referred to as the synchronous/asynchronous/auto-synchronous block execution mode. This mode may be programmed as often as desired throughout a given part program to facilitate the changing between synchronous operation, asynchronous operation and auto-synchronous operation. As will be further explained below, the auto-synchronous operation refers to a mode in which the system automatically selects whether a given part program block will be executed synchronously and asynchronously depending on the content of a specific part program block.

When motion is executed asynchronously with the logic engine, the part program blocks may execute at a rate faster than the logic engine's scan frequency. On the other hand, when part program blocks are executed synchronously with the logic engine, the logic engine is able to control the execution of each block. For example, each part program control block may have a pre-block and a post-block section at which the logic engine can halt execution of the program block. The auto-synchronous execution of part program blocks allows a given block to be executed either synchronously or asynchronously as a function of the content of the part program block. For example, blocks that do not contain S, T, or M codes or time dependent paramacro statements are executed asynchronously, whereas blocks that contain one of these functions are executed synchronously with the logic engine.

Figure 1:
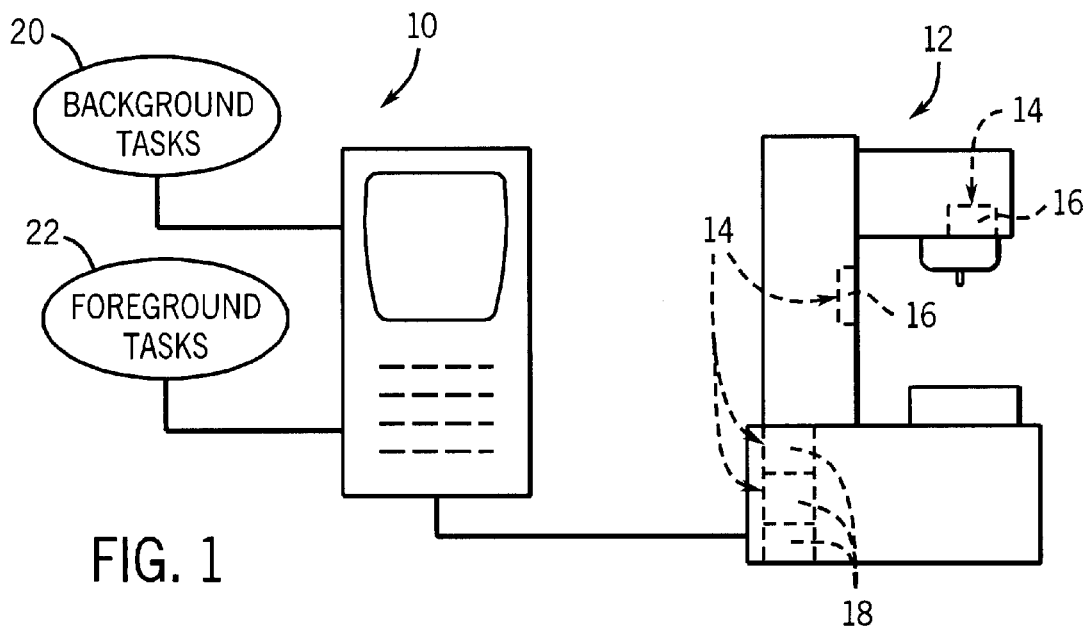
FIG. 1 is a schematic view of a computer numerical control coupled to motion control devices, according to a preferred embodiment of the present invention.

Referring generally to FIG. 1, a CNC system 10 is shown coupled to a controlled machine 12. CNC system 10 may control and monitor the activity of machine 12 via a plurality of devices 14, such as sensors 16 and servos 18, e.g. axes servos.

In an exemplary CNC system 10, CNC software contains many tasks for performing various CNC functions. These tasks typically belong to two groups, referred to as the background task group 20 and the foreground task group 22. The background task group 20 performs such functions as part program block management, block decoding and block set up, block execution and block control, various display functions, communications with a personal computer, diagnostics, etc. The foreground task group 22, on the other hand, performs functions such as interpolation, communication with the axes servos and spindles and communication with the logic engine module. CNC system 10 is able to handle such foreground tasks more efficiently.

Figure 2:
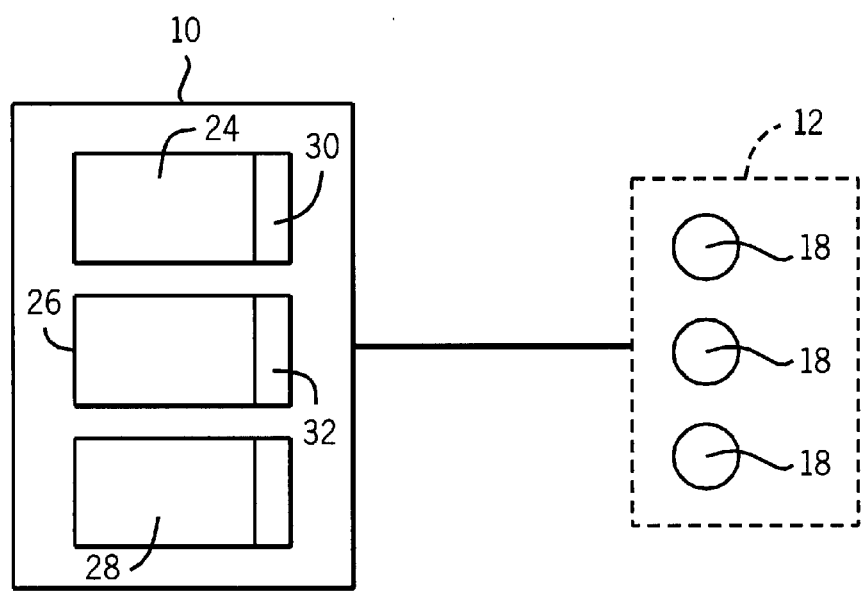
FIG. 2 is a schematic view of the computer numerical control system of FIG. 1 illustrating additional components of the system.

As illustrated in FIG. 2, CNC system 10 includes a separate logic engine module 24, a program block execution module 26 and a servo module 28. Typically, logic engine module 24 comprises a logic processor 30 that is separate from a block execution processor 32 of block execution module 26. Block execution processor 32 is the main CNC processor and part of the CNC executive responsible for controlling the transfer of data between CNC system 10 and machine 12.

In the preferred embodiment, CNC system 10 utilizes at least two interpolators, a primary interpolator 34 and a secondary interpolator 36. Furthermore, CNC system 10 utilizes at least two scan time intervals, a fine foreground scan time interval of block execution processor 32 and a foreground logic scan time interval of logic processor 30. Preferably, the fine foreground scan frequency is selectable, such that the fine foreground scan time for each cycle can be selected in a range from approximately 2 milliseconds to approximately 40 milliseconds. The foreground logic scan frequency is also variable, and the preferred foreground logic scan time interval also is in the range from approximately 2 milliseconds to 40 milliseconds. It should be noted that in the preferred embodiment the foreground logic scan time interval is always a multiple of the fine foreground scan time interval, and in the example provided, the multiple ranges from one to twenty (1–20). CNC system 10 permits the selection of both the fine foreground scan time interval and the foreground scan multiplier, e.g. a multiple from one to twenty. The multiplier and the fine foreground scan interval are selected such that the foreground logic scan time interval falls in the pre-established range from approximately two milliseconds to approximately 40 milliseconds.

Primary interpolator 34 is executed either in the foreground logic scan time interval or in a shorter fine foreground scan time interval depending on the program block execution mode, e.g. synchronous or asynchronous. Secondary interpolator 36, on the other hand, divides the output of the primary interpolator 34 into portions that are given to servos 18. The number of portions is equal to the foreground scan multiplier if the primary interpolator is being executed at the foreground logic scan time interval. However, if the primary interpolator 34 is executed in the fine foreground scan time interval, no subdivision of primary interpolator output is required.

The primary interpolator and associated motion functions, i.e. main foreground motion functions, are typically executed in the fine foreground scan time interval when CNC system 10 is operated in an asynchronous mode. These functions, however, are executed in the foreground logic scan time interval when CNC system 10 is in a synchronous block execution mode.

When CNC system 10 is in synchronous block execution mode, the primary function to be performed in the foreground logic scan interval is communication between logic processor 30 and the main CNC processor 32 responsible for executing the part program blocks. For example, spindle functions and axis movements generated by logic engine module 24 are executed once per foreground logic scan time interval. However, if CNC system 10 is in an asynchronous mode, the program blocks (e.g. motion blocks not controlled by the logic module 24) can be executed in the fine foreground scan time interval at a faster rate than otherwise possible when under the control of logic engine module 24.

As explained above, CNC system 10 preferably utilizes three logic/block execution synchronization modes. A first mode is a synchronous logic mode 38 (see FIG. 4) in which logic engine module 24 is fully synchronized with block execution carried out by block execution module 26. In this mode, all part program blocks, including motion, non-motion and hybrid blocks (blocks containing both motion and non-motion data) are fully synchronized and limited by the foreground logic scan frequency. In an asynchronous mode 40, the operation of logic engine module 24 and the execution of part program blocks are completely asynchronous. In this mode, all part program blocks, including motion blocks, non-motion blocks and hybrid blocks are executed completely asynchronously. In other words, part program blocks, such as most motion blocks, can be executed based on a shorter fine foreground scan time interval at a higher fine foreground scan frequency while the logic engine module 24 is permitted to act independently of block execution module 24. However, the logic engine scan rate could be made equal to the block execution rate when in asynchronous mode.

An auto-synchronous mode 42 is a hybrid of the synchronous mode and the asynchronous mode. In this mode, for example, both non-motion blocks and some hybrid motion blocks are fully synchronized with logic engine module 24 and their execution is limited to the logic scan time interval. However, other part program blocks with motion may be executed asynchronously with respect to the logic. By way of example, part program blocks that include S, T and M codes, time dependent paramacro functions, fixed cycles or solid tapping typically are automatically executed in sync with logic engine module 24 when CNC system 10 is in the auto-synchronous mode.

Figure 4:
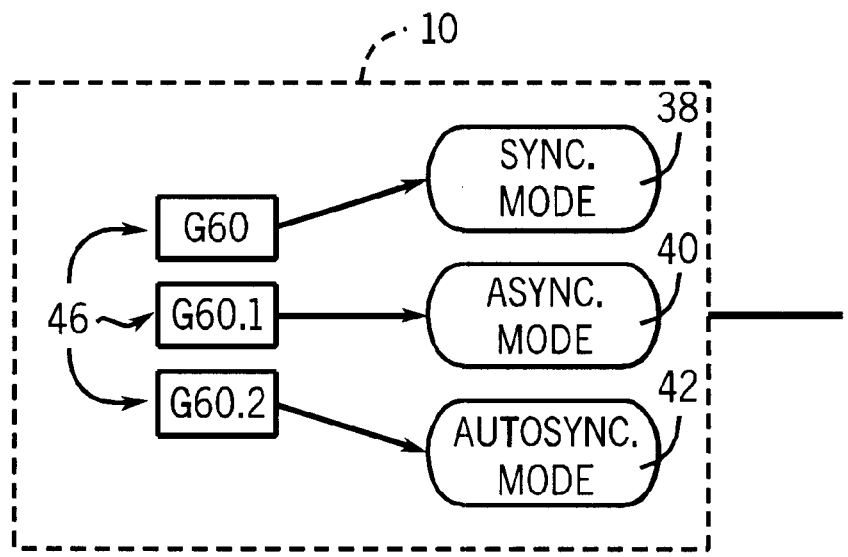
FIG. 4 is a schematic view representing mode changes of the system illustrated in FIG. 1.
Figure 3:
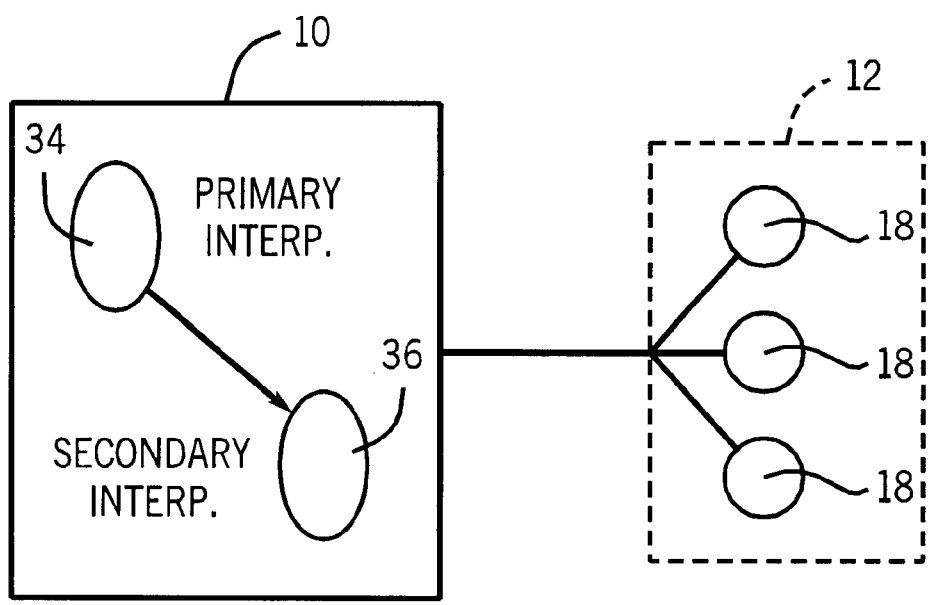
FIG. 3 is a schematic view of the system of FIG. 1 illustrating additional components of the system.

Changes from one mode to another are affected by a synchronization control parameter 46, as illustrated in FIG. 4. Preferably, synchronization control parameter 46 is a designated code that is recognized by logic engine module 24 and block execution module 26. The designation code may be programmed into the particular motion control program being executed. Mode changes between the three synchronization modes are performed in non-motion blocks contained in the part program and automatically change the mode of operation when read by CNC system 10. Synchronized control parameters 46 may comprise three unique machine control codes, known as G codes. For example, a G60 code can be used and recognized by CNC system 10 as the code for initiating a change to synchronous mode 38 (see FIG. 4). Similarly, G60.1 may be used as the synchronization control parameter that initiates a change to asynchronous mode 40. Additionally, asynchronization control parameter, such as G60.2 can be used to initiate change to auto-synchronous mode 42.

During synchronous operation, each part program block contains a pre-block, a block execution and a post-block phase that is usable by the logic module 24. The logic module 24 is able to control and hold execution of the subject block in any of these three phases, as is known to those of ordinary skill in the art. This aspect is similar to that in typical existing CNCs, such as the 9/Series CNC available from Allen-Bradley Company, L.L.C., located at 1201 South Second Street, Milwaukee, Wis. In the asynchronous mode, however, the main CNC processor 32 forces the part program execution to stop and provides an error message if, for example, a pre-block or post-block request is received from logic module 24. In this event, the condition causing the error message must be cleared before execution of the part program can be resumed. It should be noted that non-motion "setup-type" blocks may be executed as fast as possible in asynchronous mode. In other words, execution of such blocks is not limited by the communication time between the CNC and the servo subsystem.

In the auto-synchronous mode, part program blocks are executed as if the system is in synchronous or asynchronous mode, depending on the content of the block. For example, most motion blocks are executed as if the control is in asynchronous mode, while most non-motion blocks are executed as if the control is in synchronous mode. For clarification, motion blocks generally are defined as those program blocks that have a moving axes bit pattern set, regardless of whether the motion is programmed in a motion control block of the part program or generated by CNC system 10.

To simplify communication between CNC system 10 and servos 18, communication between the main CNC processor 32 and the servos 18 preferably is at a single scan time regardless of the synchronization mode. It is also preferable that this scan time, which can be referred to as a "fine scan" time, is an adjustable machine parameter. Because the fine scan time is set for all synchronization modes, changes in the execution frequency of primary interpolator 34 is not seen by servos 18.

As described above, primary interpolator 34 runs at the foreground logic scan time interval when in synchronized mode. The secondary interpolator 36 runs at the fine foreground scan time. In asynchronous mode, on the other hand, the primary interpolator 34 also runs at the fine foreground scan time interval so there is no need for a secondary interpolator. In this mode, the secondary interpolator 36 is still executed but it acts as a pass-through and does not perform any computations. Primary interpolation and secondary interpolation are performed as a function of the various synchronization modes, as illustrated in the table of FIG. 5. In auto-synchronous mode, the system automatically selects asynchronous mode or synchronous mode and interpolation is performed as described above.

In a specific example, the CNC system fine foreground scan time may be selected as 6 milliseconds. The foreground scan multiplier may be selected as a value of 4 yielding a 24 millisecond foreground logic scan time interval. When CNC system 10 is in synchronous mode, the primary interpolator runs at 24 milliseconds, while the secondary interpolator breaks the 24 millisecond interpolation commands into 6 millisecond commands, i.e. ¼ of the 24 millisecond foreground scan time interval. A "fine" interpolator on servo module 28 breaks the 6 millisecond commands down to the size required by the servo card or servo system. This time interval often is one or two milliseconds for the type of servo systems used to control a typical machine tool.

When the CNC system 10 is in asynchronous mode or during a motion block in auto-synchronous mode, the primary interpolator 34 is executed every 6 milliseconds and the secondary interpolator 36 acts as a pass-through. At each 24 millisecond interval, the system checks whether the functions running at the foreground logic scan time have completed their operation during the previous 24 millisecond iteration. If not, a system error is generated forcing an emergency stop of part program execution.

Figure 6:
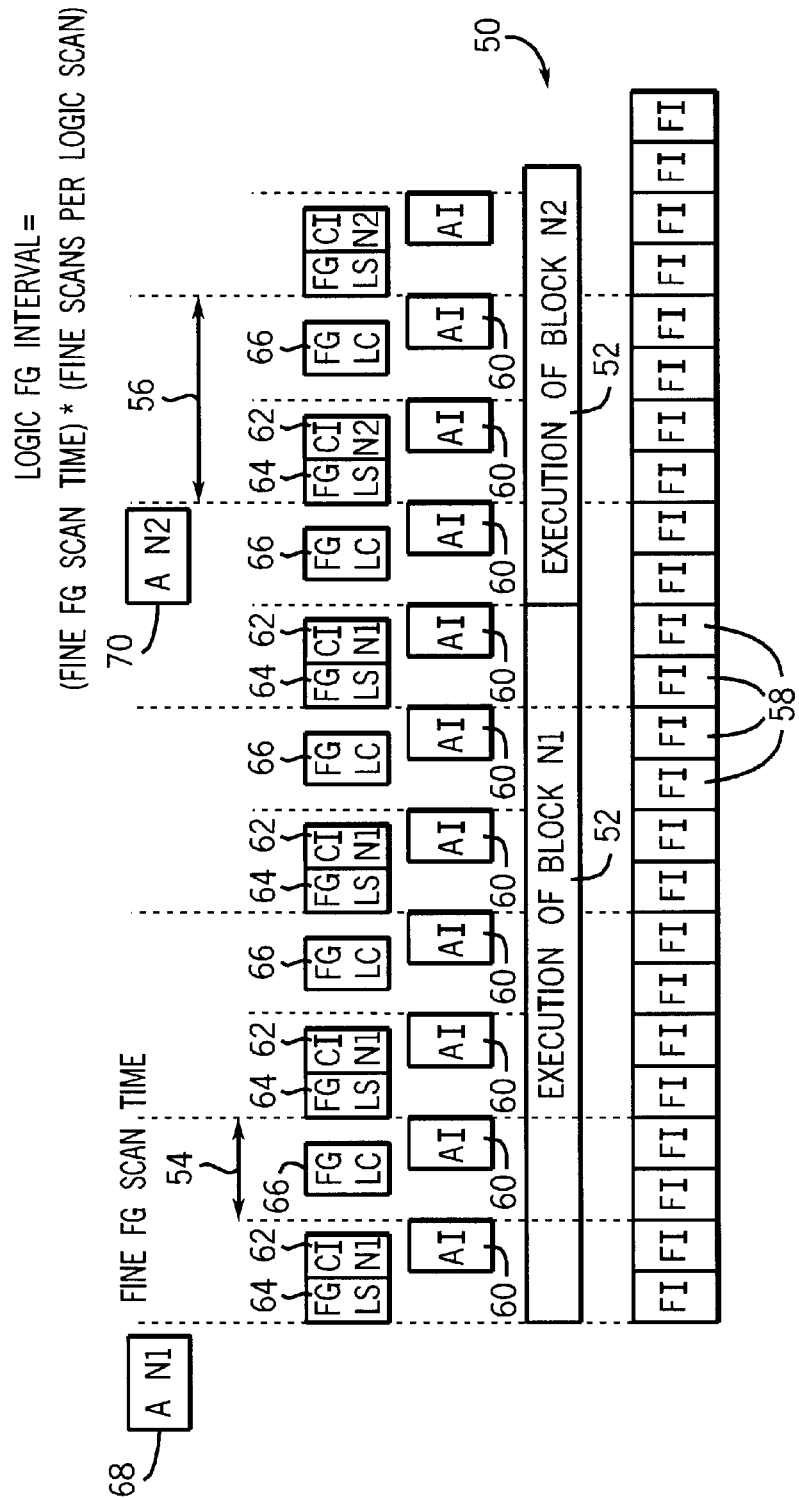
FIG. 6 is a schematic illustration of part program block execution in a synchronous mode.
Figure 7:
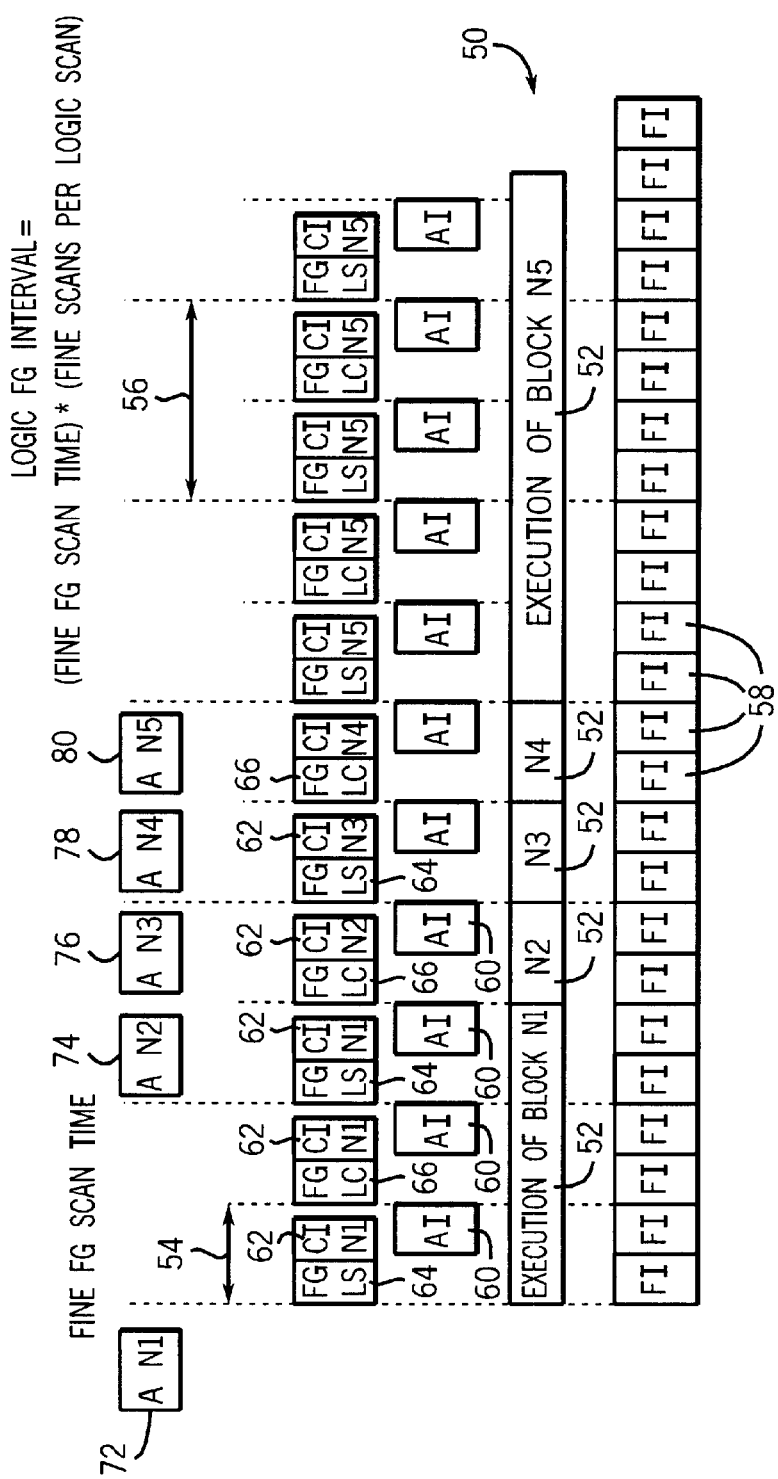
FIG. 7 is a schematic illustration of part program block execution in asynchronous mode.
Figure 8:
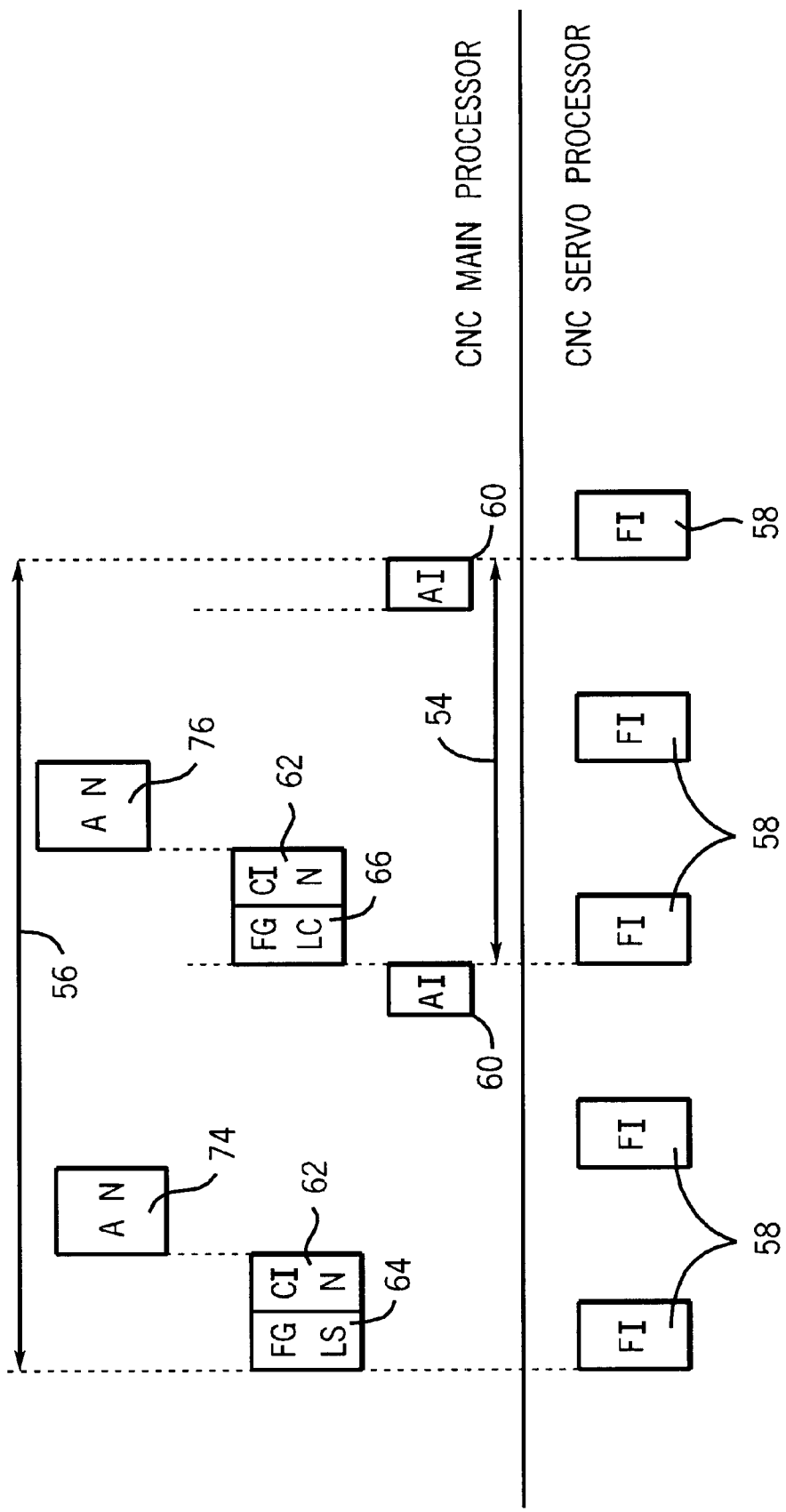
FIG. 8 is an expanded portion of the schematic illustration of FIG. 7.

Referring generally to FIGS. 6 through 8, the execution of a part program 50 under the various modes of operation is schematically illustrated. In FIG. 6 part program 50 includes a plurality of blocks 52 (see block N1 and N2) that are executed in synchronous mode. In this example, the fine foreground scan frequency is selected with a fine foreground scan time interval represented by arrow 54. The fine foreground scan time multiplier is greater than one and the logic foreground scan time interval can be determined by multiplying the fine foreground scan time interval by the number of fine scans per logic scan, e.g. the multiplier. The logic foreground scan time interval is represented by arrow 56.

Each fine interpolation of the servo processor in servo module 28 is represented by a box 58. Similarly, each secondary interpolation of secondary interpolator 36, referred to as an axis interpolation, is illustrated by a box 60. A secondary interpolation occurs during each fine foreground scan time interval 54. A primary or coarse interpolation occurs during each logic foreground scan time interval 56 and is represented by boxes 62. Additionally, for each logic foreground scan time interval 56 a foreground logic execution start is represented by a box 64, and a foreground logic execution complete is represented by a box 66.

In the illustrated example, the execution of program block N1 is initiated at the beginning of the leftmost logic foreground time scan interval 56 and is represented by start block 68. The execution of block N1 continues into the fourth logic foreground scan time interval. Subsequently, the execution of block N2 is initiated as represented by start block 70. However, because the system is operating in synchronous mode, the execution of block N2 begins only at the foreground logic execution start 64 of the next subsequent logic foreground time scan interval. In other words, the scan time of the logic module controls the speed at which part program blocks 52 are executed. The shortest time span in which a part program block 52 can be executed is the logic foreground scan time interval 56.

In contrast, asynchronous mode program block execution does not require the execution of individual blocks wait for completion of the logic foreground scan time interval, as illustrated in FIGS. 7 and 8. In the example illustrated, part program 50 again includes plurality of program blocks 52 (see blocks N1, N2, N3, N4 and N5). In the asynchronous mode, however, both secondary interpolation (see blocks 60) and primary or coarse interpolation (see blocks 62) is performed during each fine foreground scan time interval. The foreground logic execution start (see blocks 64) and the foreground logic execution complete (see blocks 66) occur during each logic foreground scan time interval 56, as described above with reference to FIG. 6.

In asynchronous operation, the execution of program block N1 is initiated at the leftmost side of the illustration in FIG. 7, as represented by block 72. The execution of block N1 is completed in the middle of the second logic foreground scan time interval 56. But, the execution of program block N2, as represented by box 74, is initiated and completed during the latter fine foreground scan time interval of the second logic foreground scan time interval. Execution of the third block, N3, is initiated at the beginning of the third logic foreground scan time interval, as represented by box 76. This program block is completed within the corresponding fine foreground scan time interval, and execution of program block N4 is initiated within the same logic foreground scan time interval, as represented by box 78. The execution of block N4 is completed by the end of the subject logic foreground scan time interval and the execution of block N5 is initiated, as represented by box 80. Block N5 is a longer program block that extends through multiple logic foreground scan time intervals. An enlarged illustration of the execution of multiple blocks within a single logic foreground scan time interval is illustrated in FIG. 8.

When the mode is changed to auto-synchronous mode, the specific mode utilized for a given block or plurality of blocks is dictated by program block content. Depending on the type of program block (N1, N2, N3 . . . ), CNC system 10 operates either in synchronous mode, as illustrated in FIG. 6 or asynchronous mode as illustrated in FIGS. 7 and 8.

It will be understood that the foregoing description is of a preferred exemplary embodiment of this invention and that the invention is not limited to the specific forms shown. For example, the use of synchronous, asynchronous and auto-synchronous modes may be incorporated into a variety of CNCs having a variety of architectures; the logic module and the block execution module may comprise separate processors disposed at the same or separate locations on the same or separate workstations; a variety of synchronization control parameters may be used in a given motion control program to initiate the change of modes during execution of the program; and the specific functions controlled in synchronous mode, asynchronous mode or auto-synchronous mode can vary from one application or architecture to another. These and other modifications may be made in the design and arrangement of the elements described above without departing from the scope of the invention as expressed in the appended claims.

What is claimed is:

1. A computer numerical control system, comprising:
    a block execution module able to execute a plurality of data blocks in a part program, used for controlling a machine;
    a logic engine module able to control the execution of one or more of the plurality of data blocks depending on parameters of the part program, wherein the logic engine module operates according to a logic engine scan rate and the block execution module operates at a block execution scan rate that is in a synchronous mode or an asynchronous mode with respect to the logic engine cycle rate; and
    a synchronization control parameter entered into the part program, wherein the synchronization control parameter is able to initiate a change between the synchronous mode and the asynchronous mode during execution of its part program.

2. The computer numerical control system as recited in claim 1, wherein the block execution module comprises a block execution processor and the logic engine comprises a logic engine processor.

3. The computer numerical control system as recited in claim 1, wherein the synchronization control parameter is selected to maintain operation of the block execution module in the synchronous mode with respect to the logic engine module.

4. The computer numerical control system as recited in claim 1, wherein the synchronization control parameter is selected to maintain operation of the block execution module in the asynchronous mode with respect to the logic engine module.

5. The computer numerical control system as recited in claim 1, wherein the synchronization control parameter is selected to initiate an autosynchronous mode in which the block execution module switches between the synchronous mode operation and the asynchronous mode operation depending on the content of each data block being executed.

6. The computer numerical control system as recited in claim 1, wherein the block execution scan rate is based on an adjustable scan time interval.

7. The computer numerical control system as recited in claim 6, wherein the logic engine scan rate is based on a logic scan time interval that is a multiple of the adjustable scan time interval, the multiple being an adjustable parameter.

8. The computer numerical control system as recited in claim 7, wherein the multiple is in the range from 1 to 20.

9. The computer numerical control system as recited in claim 8, wherein the logic scan time interval is in the range from approximately 2 milliseconds to approximately 40 milliseconds.

10. The computer numerical control system as recited in claim 1, wherein the logic engine scan rate is equal to the block execution rate during asynchronous mode.

11. A method of executing a part program on a computer numerical control, comprising:
   executing a plurality of data blocks of a control program;
   subjecting at least some of the plurality of data blocks to the control of a logic engine operating at a logic scan rate; and
   selectively changing the execution of the plurality of data blocks from a synchronized state with respect to the logic scan rate to an asynchronized state during execution of the control program.

12. The method as recited in claim 11, further comprising changing the execution of the plurality of data blocks from the asynchronized state to synchronized execution with respect to the logic scan rate.

13. The method as recited in claim 12, further comprising automatically changing execution of the plurality of data blocks between the asynchronized state and synchronization with the logic scan rate depending on the content of the data block to be executed.

14. The method as recited in claim 11, wherein selectively changing comprises placing an appropriate instruction in the control program.

15. The method as recited in claim 14, wherein placing includes programming a predetermined G-code into the control program.

16. The method as recited in claim 12, further comprising establishing a logic scan rate having a scan time interval in the range from approximately 2 milliseconds to 40 milliseconds.

17. A method for efficient operation of a computer numerical control that utilizes a logic engine having a logic scan frequency, comprising:
   executing certain blocks of a motion control program in synchronization with the logic engine;
   executing other blocks of the motion control program in asynchronization with the logic engine; and
   changing between synchronized execution and asynchronized execution during execution of the motion control program.

18. The method as recited in claim 17, further comprising placing a code in the control program that causes a change from synchronized execution to asynchronized execution.

19. The method as recited in claim 17, further comprising placing a code in the control program that causes a change from asynchronized execution to synchronized execution.

20. The method as recited in claim 17, further comprising placing a code in the control program that causes automatic changes between synchronized and asynchronized execution depending on the content of a control program block to be executed.

21. The method as recited in claim 17, further comprising determining a logic scan frequency.

* * * * *